(12) United States Patent
Zelent

(10) Patent No.: US 11,292,535 B2
(45) Date of Patent: Apr. 5, 2022

(54) SERVICE VEHICLE STORAGE COMPARTMENT DOOR ALARM SYSTEM

(71) Applicant: Vernon Zelent, Okanagan Falls (CA)

(72) Inventor: Vernon Zelent, Okanagan Falls (CA)

(*) Notice: Subject to any disclaimer, the term of this patent is extended or adjusted under 35 U.S.C. 154(b) by 120 days.

(21) Appl. No.: 16/526,292

(22) Filed: Jul. 30, 2019

(65) Prior Publication Data
US 2020/0086931 A1 Mar. 19, 2020

Related U.S. Application Data

(60) Provisional application No. 62/800,120, filed on Feb. 1, 2019, provisional application No. 62/730,698, filed on Sep. 13, 2018.

(51) Int. Cl.

| | | |
|---|---|---|
| *B62D 33/037* | (2006.01) | |
| *B60P 7/02* | (2006.01) | |
| *E05B 45/06* | (2006.01) | |
| *G04G 13/02* | (2006.01) | |
| *E05B 55/12* | (2006.01) | |

(52) U.S. Cl.
CPC .............. *B62D 33/037* (2013.01); *B60P 7/02* (2013.01); *E05B 55/12* (2013.01); *G04G 13/026* (2013.01); *E05B 2045/065* (2013.01)

(58) Field of Classification Search
CPC ........... B60P 7/02; G04G 13/026; B60R 9/00; B60R 9/02; B60R 9/06; B60R 7/00; B60R 7/04; B60R 11/06; B60R 2011/0096; B60R 2011/0098; E05B 45/06; E05B 2045/0615; E05B 2045/065; E05B 2045/0655; E05B 2045/0665

USPC ............ 296/37.1–37.16, 181.3, 24.44, 24.45
See application file for complete search history.

(56) References Cited

U.S. PATENT DOCUMENTS

| | | | | | |
|---|---|---|---|---|---|
| 4,775,768 | A | * | 10/1988 | Kanbar | F25D 27/00 200/345 |
| 4,873,936 | A | * | 10/1989 | Ponticelli | B60R 11/02 116/33 |
| 4,967,045 | A | * | 10/1990 | Keefer | H01H 13/183 200/296 |
| 5,045,838 | A | * | 9/1991 | Ghazarian | B60R 11/02 340/457 |
| 5,166,662 | A | * | 11/1992 | Santagato | B60R 13/005 340/426.29 |
| 5,210,736 | A | * | 5/1993 | Hayama | G11B 15/675 360/137 |

(Continued)

*Primary Examiner* — Gregory A Blankenship
(74) *Attorney, Agent, or Firm* — Robert M. Hendry

(57) ABSTRACT

There is disclosed a Service Vehicle storage compartment door alarm system. In an embodiment, the system comprises an alarm pin switch bracket having one or more apertures for mounting the alarm pin switch bracket to a vehicle storage compartment door latch system using existing mounting fasteners and an alarm pin switch mounted to the alarm pin switch bracket, the alarm pin switch adapted to detect movement of the vehicle storage compartment door handle to trigger an alarm signal, the alarm pin switch including a connection point for connecting a signal wire. A plurality of alarm pin switch brackets mounted to a plurality of vehicle storage compartment door latch systems may all be connected via signal wires to a central alarm system for activating an alarm upon detection of movement of any one of the vehicle storage compartment door handles.

9 Claims, 20 Drawing Sheets

(56) References Cited

U.S. PATENT DOCUMENTS

| | | | | |
|---|---|---|---|---|
| 5,727,835 | A * | 3/1998 | Krush | B60R 9/00 |
| | | | | 224/404 |
| 5,823,598 | A * | 10/1998 | Clare | B60R 11/06 |
| | | | | 296/37.6 |
| 6,081,186 | A * | 6/2000 | Adams | B60R 25/1001 |
| | | | | 116/33 |
| 6,237,211 | B1 * | 5/2001 | Clare | B60R 11/06 |
| | | | | 29/401.1 |
| 6,633,210 | B1 * | 10/2003 | Fischer | H01H 71/46 |
| | | | | 335/13 |
| 6,966,593 | B2 * | 11/2005 | Plentis | B60R 9/02 |
| | | | | 224/402 |
| 2001/0038218 | A1 * | 11/2001 | Clare | F16F 9/42 |
| | | | | 296/37.6 |
| 2005/0261816 | A1 * | 11/2005 | DiCroce | B60R 25/10 |
| | | | | 701/36 |
| 2008/0179908 | A1 * | 7/2008 | Haber | B60K 28/12 |
| | | | | 296/37.6 |
| 2020/0086931 | A1 * | 3/2020 | Zelent | E05B 45/083 |
| 2020/0148125 | A1 * | 5/2020 | H N | B60R 7/087 |

\* cited by examiner

SERVICE VEHICLE STORAGE COMPARTMENT DOOR ALARM SYSTEM

FIELD OF THE INVENTION

The present invention relates generally to service vehicle storage compartment door alarm systems.

BACKGROUND

Many types of service vehicles such as trucks and vans may have multiple storage compartments for storing items, as illustrated by way of example in FIG. 1. These storage compartments are vulnerable to theft, as the locking mechanisms, while secure, may not be as robust as locking mechanisms for the driver or passenger doors, and arming the large number of storage compartment doors with an alarm may be cost prohibitive. Even if an alarm system is installed, existing general alarm systems for service vehicles generally activate after a compartment door is forced open, and often, all the contents from that compartment will be stolen before the vehicle owner is alerted.

What is needed is an improved service vehicle storage compartment door alarm system which addresses at least some of the limitations in the prior art.

SUMMARY

The present invention relates to an improved service vehicle storage compartment door alarm system which is adapted to trigger an alarm as soon as an attempted entry is made.

In an embodiment, the vehicle storage compartment door alarm system includes an alarm pin switch bracket assembly adapted to attach to an existing vehicle storage compartment door latch, using existing fasteners and fastening points.

In an embodiment, the alarm pin switch bracket may be installed as an aftermarket upgrade of a vehicle storage compartment door having a WHALE TAIL™ regular or roller type latch, or a T-handle type latch. The alarm pin switch bracket is also adaptable to other types of vehicle storage compartment door handles requiring rotation or lifting to operate the compartment door latch.

In an embodiment, the alarm pin switch bracket assembly includes an alarm pin switch connected via a wire to a central alarm system.

The alarm pin switch is calibrated to detect movement of the compartment door handle, including movements caused by an attempted opening of the compartment door handle.

In an embodiment, the alarm pin switch is activated when one or more of the alarm pin switch metal tabs contact the pin switch body, thereby creating a ground fault.

In an embodiment, the alarm pin switch bracket may be installed on multiple compartment door latches, or all the compartment door latches on a Service vehicle. If multiple alarm pin switch brackets are installed, each alarm pin switch bracket would include an alarm pin switch, each connected via a wire to the central alarm system. For connection to the central alarm system, all the wires leading to the central alarm system from each alarm pin switch may be collected and connected at a hub, such that it is only necessary to make a single wire connection to the central alarm system.

Upon the alarm pin switch trigger being activated, a signal travels via the connecting wire to the central alarm system. The central alarm system then activates one or more alarms in the vehicle to warn the intruder that the attempted unauthorized entry has been detected.

The one or more alarms may comprise, for example, repeatedly honking the horn, flashing warning lights, announcing an audible warning, and/or sending a wireless alert to the vehicle owner via a cellular network.

Advantageously, by triggering an alarm as soon as an attempt is made to force open a service vehicle storage compartment door, a potential thief is not given an opportunity to successfully force open the compartment door without lingering and increasing their chances of getting caught.

In this respect, before explaining at least one embodiment of the invention in detail, it is to be understood that the invention is not limited in its applications to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION

As noted above, the present invention relates to an improved service vehicle storage compartment door alarm system which is adapted to trigger an alarm as soon as an attempted entry is made.

In an embodiment, the vehicle storage compartment door alarm system includes an alarm pin switch bracket assembly adapted to attach to an existing vehicle storage compartment door latch, using existing fasteners and the fastening points.

In an embodiment, the alarm pin switch bracket may be installed as an aftermarket upgrade of a vehicle storage compartment door having a WHALE TAIL™ regular or WHALE TAIL™ roller type latch, or a T-handle latch system. The alarm pin switch bracket is also adaptable to other types of vehicle storage compartment door handles requiring rotation or lifting to operate the compartment door.

In an embodiment, the alarm pin switch bracket assembly includes an alarm pin switch connected via a wire to a central alarm system.

The alarm pin switch is calibrated to detect movement of the compartment door handle, including movements caused by an attempted opening of the compartment door handle.

In an embodiment, the alarm pin switch is activated when one or more of the alarm pin switch metal tabs contact the pin switch body, thereby creating a ground fault.

In an embodiment, the alarm pin switch bracket may be installed on multiple compartment door handles, or all the compartment door handles on a Service vehicle. If multiple alarm pin switch brackets are installed, each alarm pin switch bracket would include an alarm pin switch, each connected via a wire to the central alarm system. For connection to the central alarm system, all the wires leading to the central alarm system from each alarm pin switch may be collected and connected at a hub, such that it is only necessary to make a single wire connection to the central alarm system.

Upon the alarm pin switch trigger being activated, a signal travels via the connecting wire to the central alarm system. The central alarm system then activates one or more alarms in the vehicle to warn the intruder that the attempted unauthorized entry has been detected.

The one or more alarms may comprise, for example, repeatedly honking the horn, flashing warning lights, announcing an audible warning, and/or sending a wireless alert to the vehicle owner via a cellular network.

Illustrative embodiments will now be described with reference to the drawings.

Figure 1:
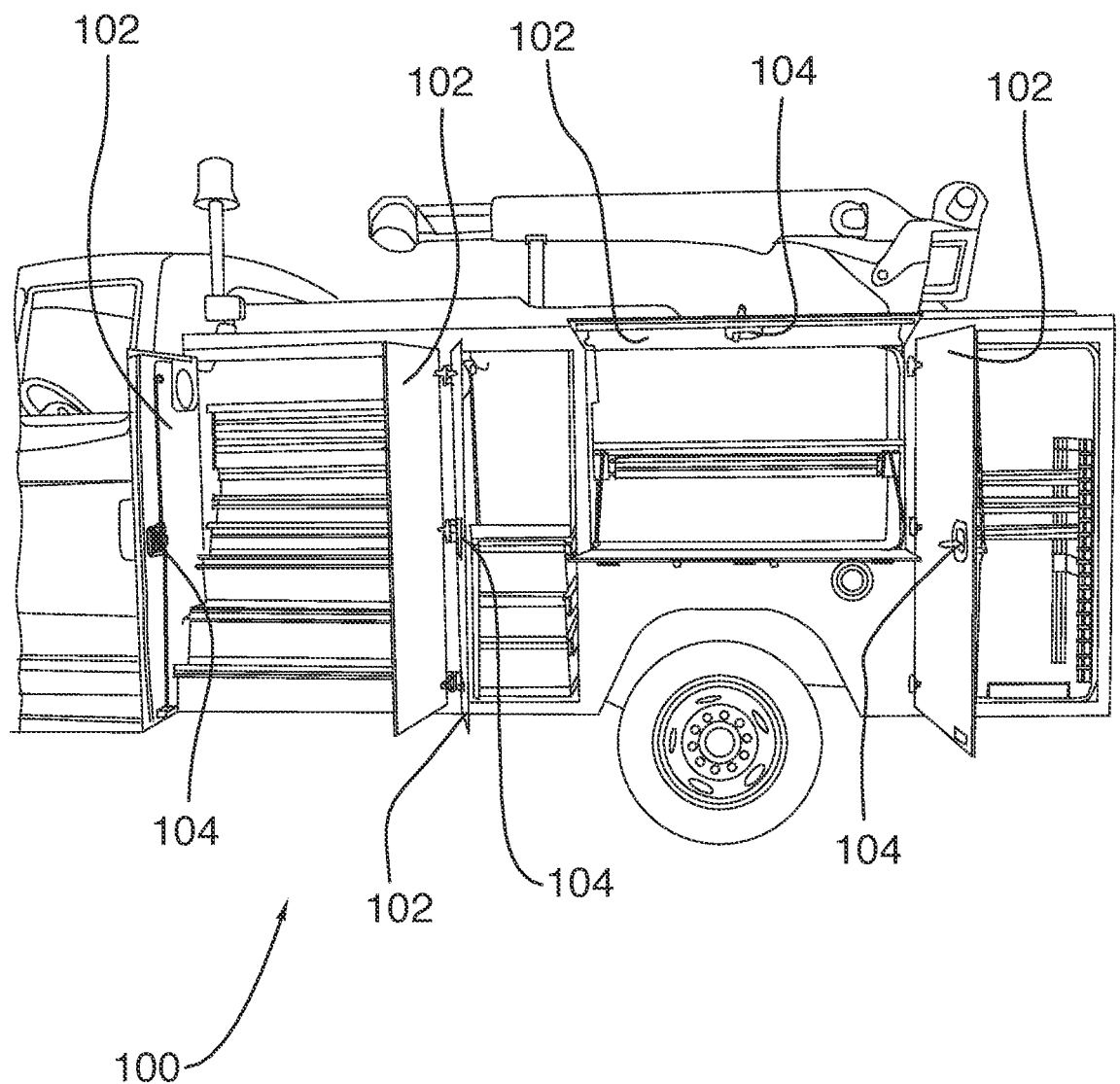
FIG. 1 shows an illustrative example of a Service vehicle having multiple storage compartment doors in an open position.

As illustrated in FIG. 1, shown is an example of a Service vehicle 100 having multiple storage compartment doors 102 in an open position. Each compartment door 102 includes a lockable handle 104.

Figure 2A:
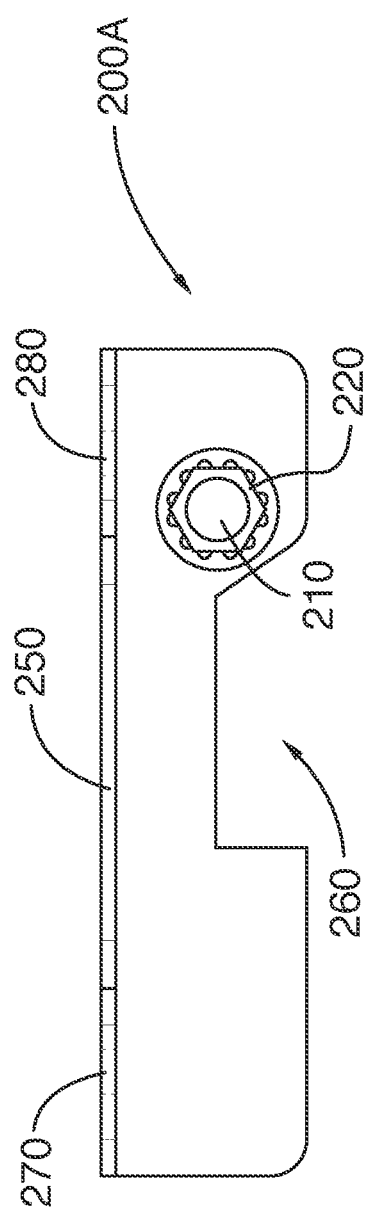
FIGS. 2A-2C show top, front and side views, respectively, of an alarm pin switch bracket in accordance with an embodiment for a WHALE TAIL™ regular type latch.
Figure 2B:
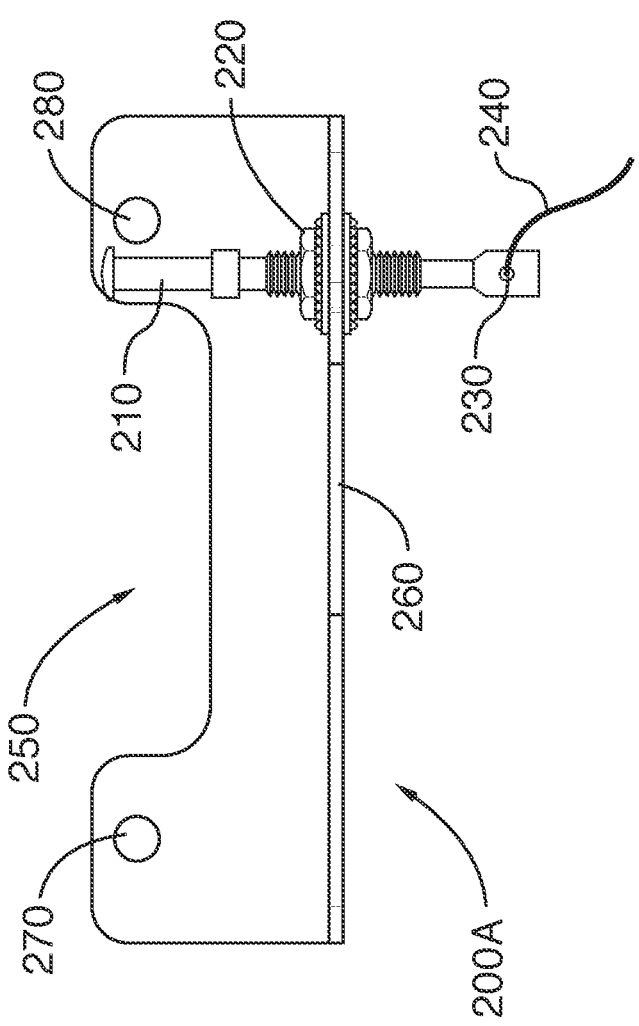
Figure 2C:
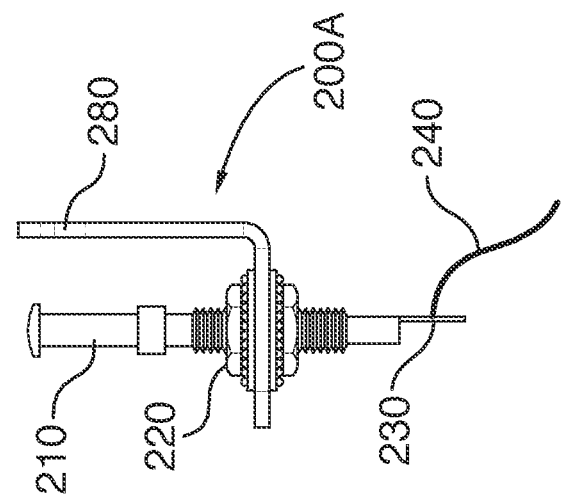
Figure 2D:
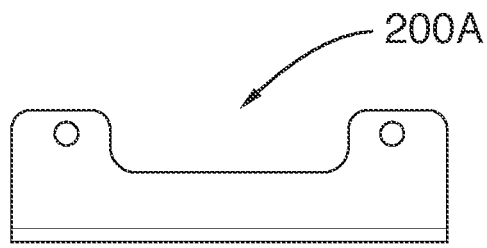
FIGS. 2D-2H show additional views of the alarm pin switch bracket of FIGS. 2A-2C.
Figure 2E:
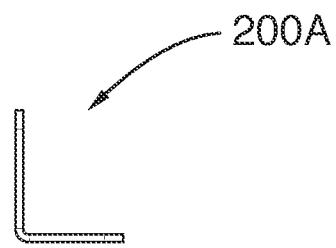
Figure 2F:
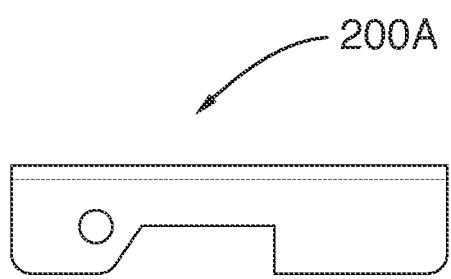
Figure 2G:
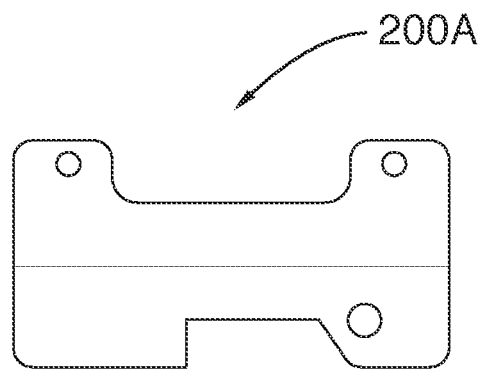
Figure 2H:
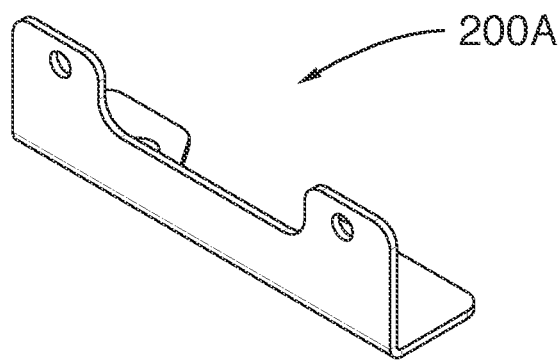

Now referring to FIGS. 2A-2C, shown are top front, and side views, respectively, of an alarm pin switch bracket 200A in accordance with an embodiment, in this illustrative case for WHALE TAIL™ regular type latches such as, but not limited to, an Eberhard™ Model 18420-54PRL_0. As shown in FIG. 2A, the alarm pin switch bracket 200A includes an alarm pin switch 210 mounted thereon with an alarm pin switch mounting assembly 220. The alarm pin switch mounting assembly 220 includes a resiliently flexible member, such as a spring, which allows the alarm pin 210 to move relative to the bracket 200A when a force is applied to the pin 210, and to return the pin 210 to its original position when the force is removed. The alarm pin 210 includes a connection point 230 for connecting a signal wire 240 leading to a central alarm system, as discussed further below.

Still referring to FIGS. 2A-2C, the alarm pin switch bracket 200A is suitably shaped to include notches 250, 260 and mounting apertures 270, 280 as necessary to allow the alarm pin switch bracket 200A to be mounted as an aftermarket accessory on existing service vehicle storage compartments door latch systems. More particularly, in this illustrative example, mounting apertures 270, 280 allow the alarm switch bracket 200A to be mounted using existing mounting screws for a popular Eberhard™ WHALE TAIL™ regular type latch, commonly found on service vehicle storage compartment doors as shown earlier by way of example in FIG. 1.

FIGS. 2D to 2H show various additional views of the alarm pin switch bracket 200A for a WHALE TAIL™ regular type latch.

Figure 2I:
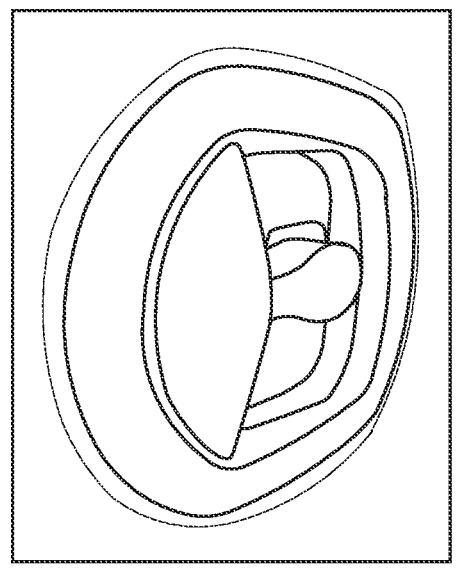
FIG. 2I-2L show various views of an alarm pin switch bracket of FIGS. 2A-2H as installed on a latch in accordance with an embodiment.

A close-up view of a WHALE TAIL™ regular type latch is shown in FIG. 2I and labeled as 300.

Figure 2J:
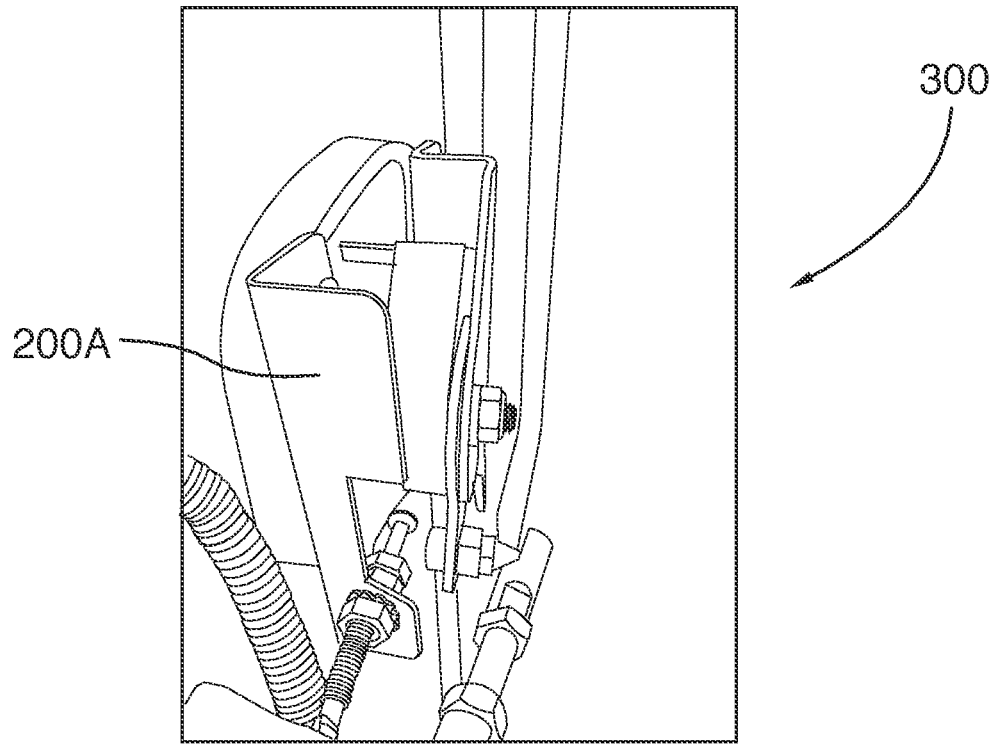
Figure 2K:
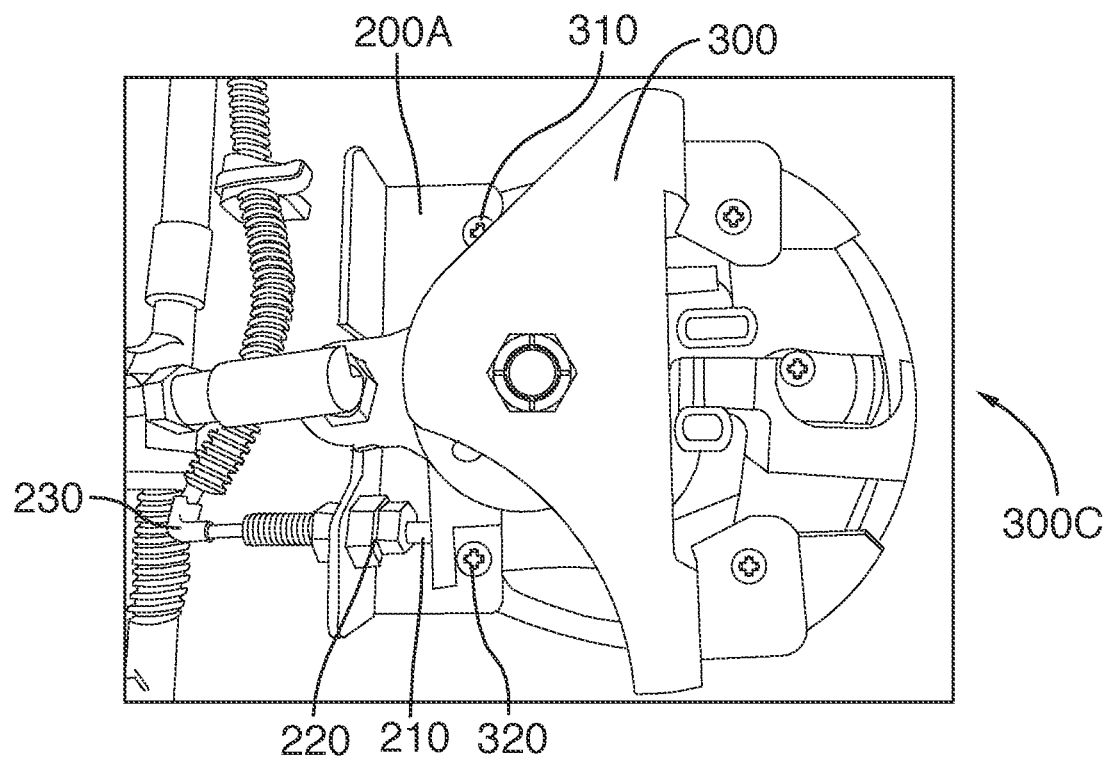
Figure 2L:
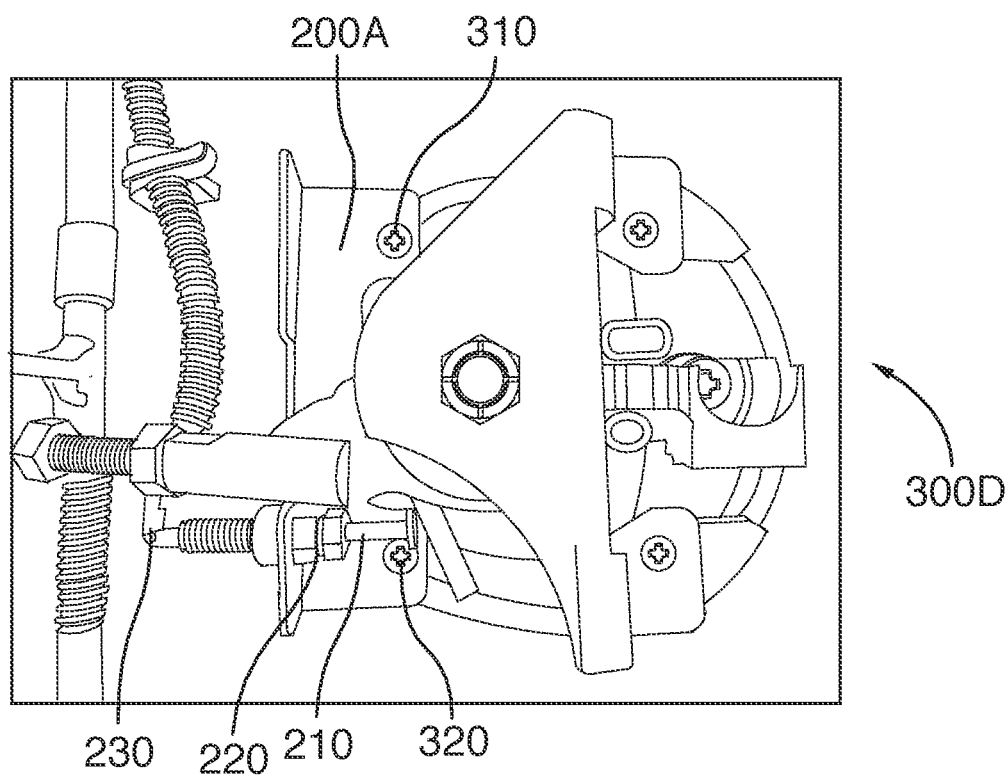

FIGS. 2J-2L show views of alarm pin switch bracket 200A mounted to an Eberhard™ WHALE TAIL™ regular type latch 300, with mounting screws 310, 320 passing through apertures 270, 280 as previously shown in FIGS. 2A-2C. The notches 250, 260 also accommodate the linkage and various moving parts of the regular type latch 300 and allow a full range of motion and operation of the WHALE TAIL™ regular type latch linkage.

FIGS. 3A to 3E show another illustrative example of an alarm pin switch bracket 200B, which is analogous to alarm pin switch bracket 200A but is adapted to fit Eberhard™ WHALE TAIL™ roller latches instead. The alarm pin switch bracket 200B is mounted using mounting apertures 270 and 280, corresponding to the mounting apertures 270 and 280 as previously shown in alarm pin switch bracket 200A.

Figure 3A:
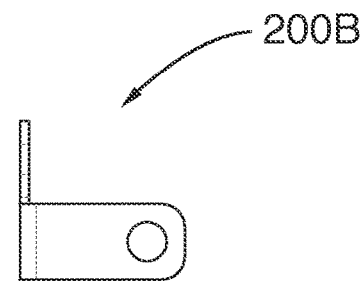
FIG. 3A-3E shows various views of an alarm pin switch bracket in accordance with another embodiment for a WHALE TAIL™ roller type latch.
Figure 3B:
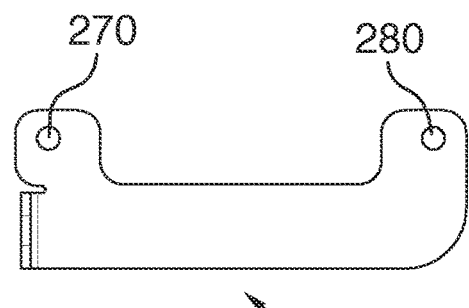
Figure 3C:
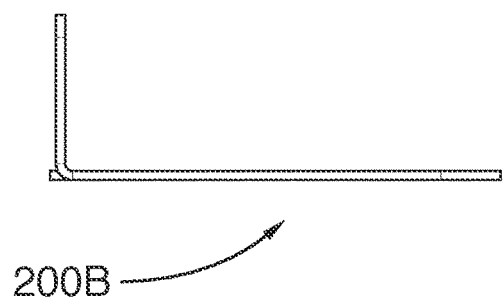
Figure 3D:
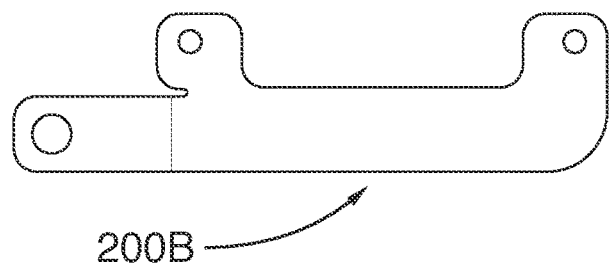
Figure 3E:
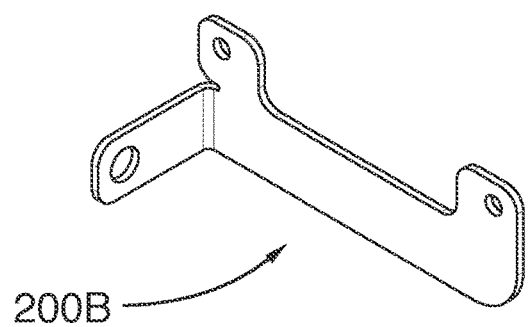
Figure 3F:
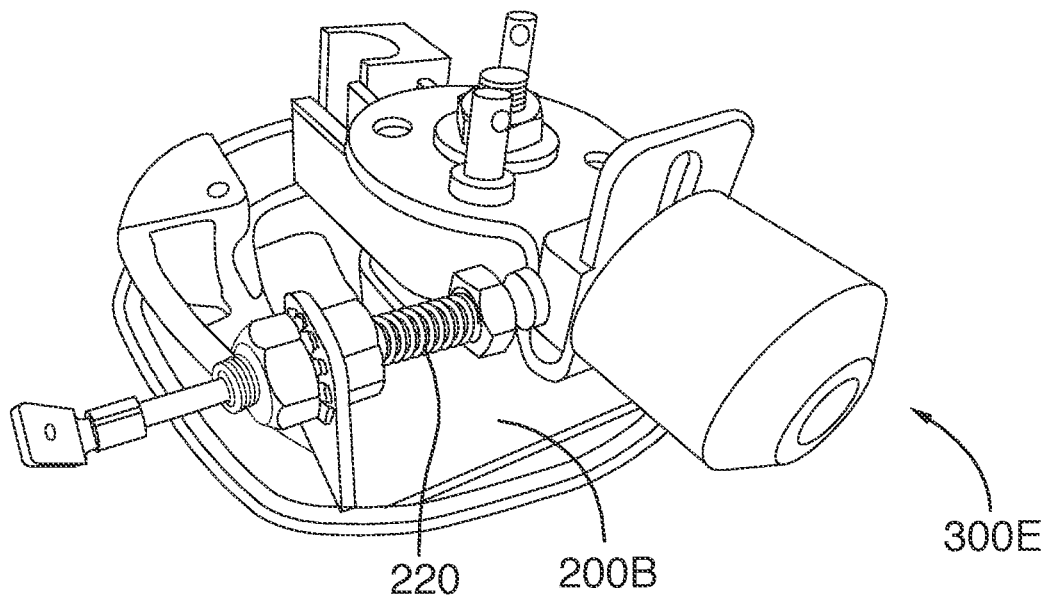
FIGS. 3F to 3I show the alarm pin switch bracket of FIGS. 3A-3E as installed on a WHALE TAIL™ roller type latch.
Figure 3G:
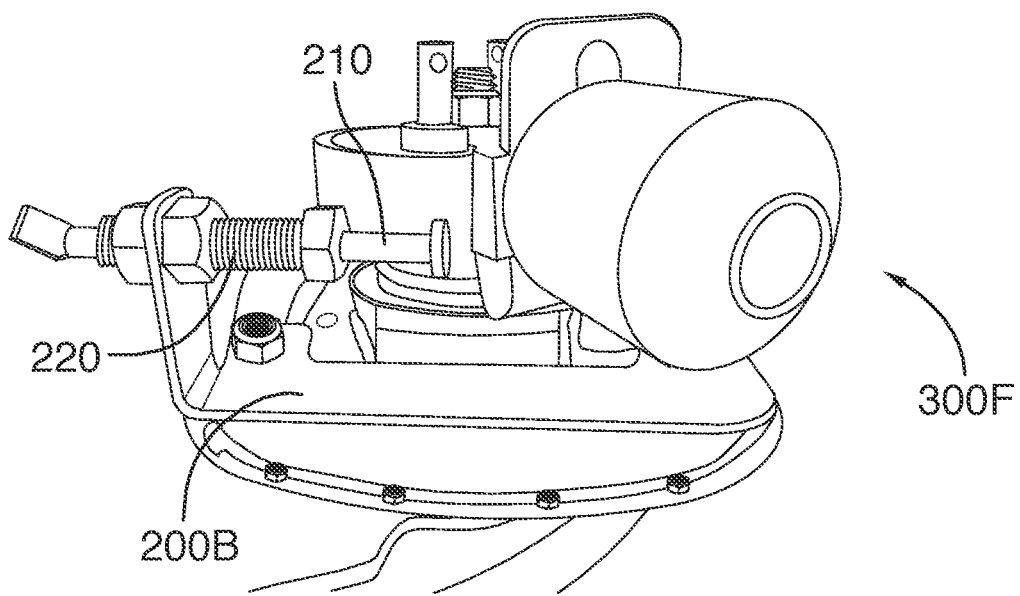
Figure 3H:
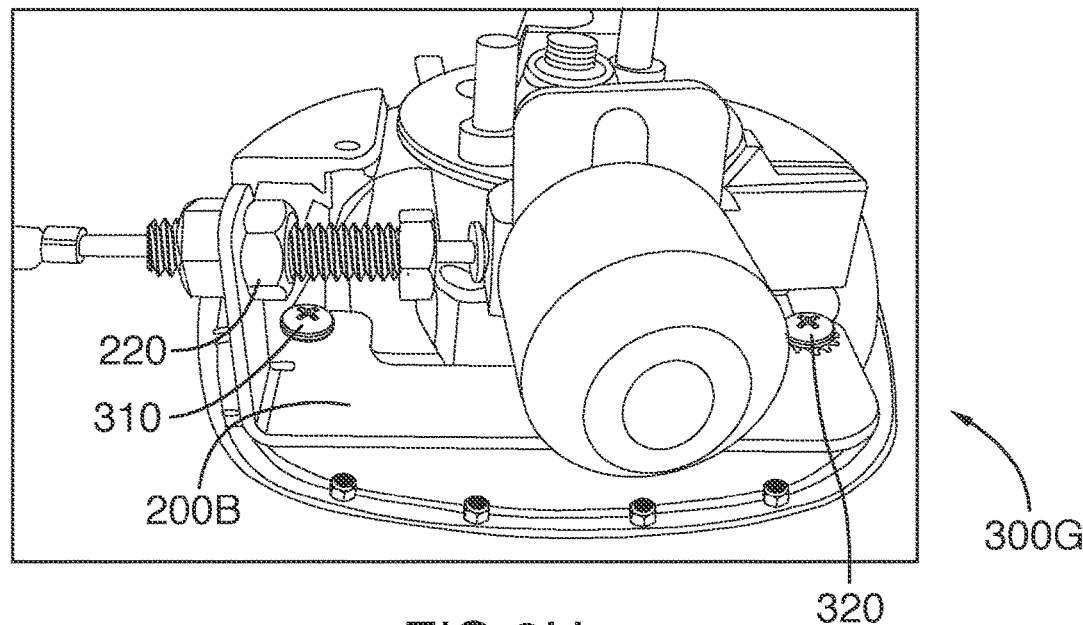
Figure 3I:
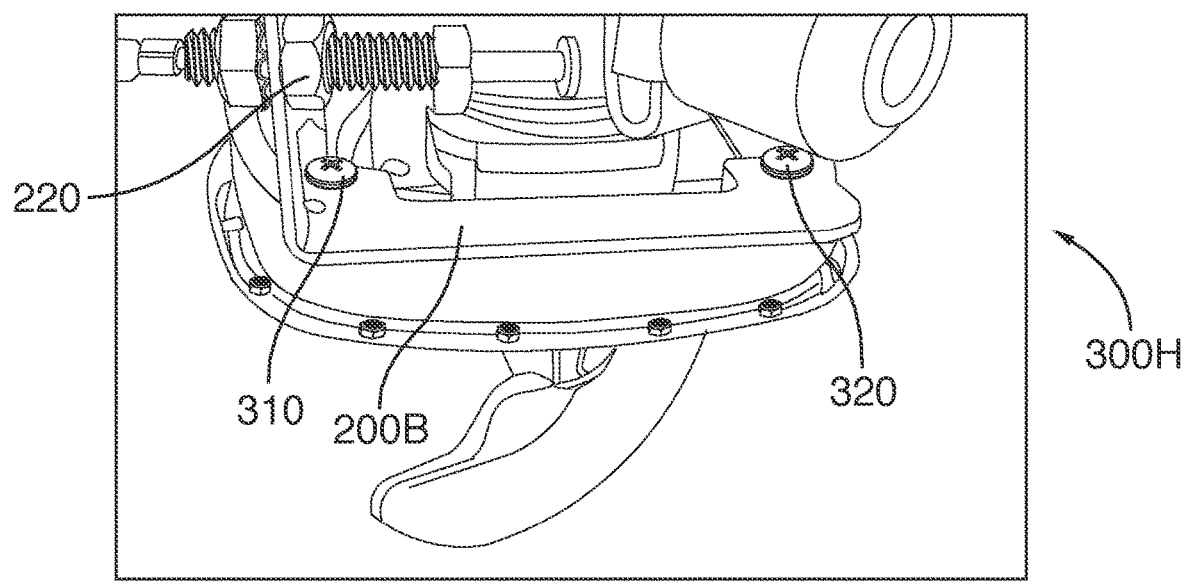

FIGS. 3F-3I show the alarm pin switch bracket 200B mounted to a roller type latch, with alarm pin switch mounting assembly 220 mounted thereto. In operation, the base of the roller depresses/disengages the alarm pin 210 switch when the latch is closed and releases/engages the alarm pin switch when the latch is opened. In this illustrative example, the roller type latch is an Eberhardt™ PN. 28400-RSS-J201-03—a WHALE TAIL™ latch that incorporates a roller closure. However, it will be appreciated that this illustrative example is not limiting, and a suitable alarm pin switch bracket may be adapted to be installed on various other types of latches with roller closures. FIGS. 3H and 3I show mounting screws 310 & 320 used to install the alarm pin switch bracket 200B on a WHALE TAIL™ roller type latch, for example as an aftermarket upgrade.

Figure 4:
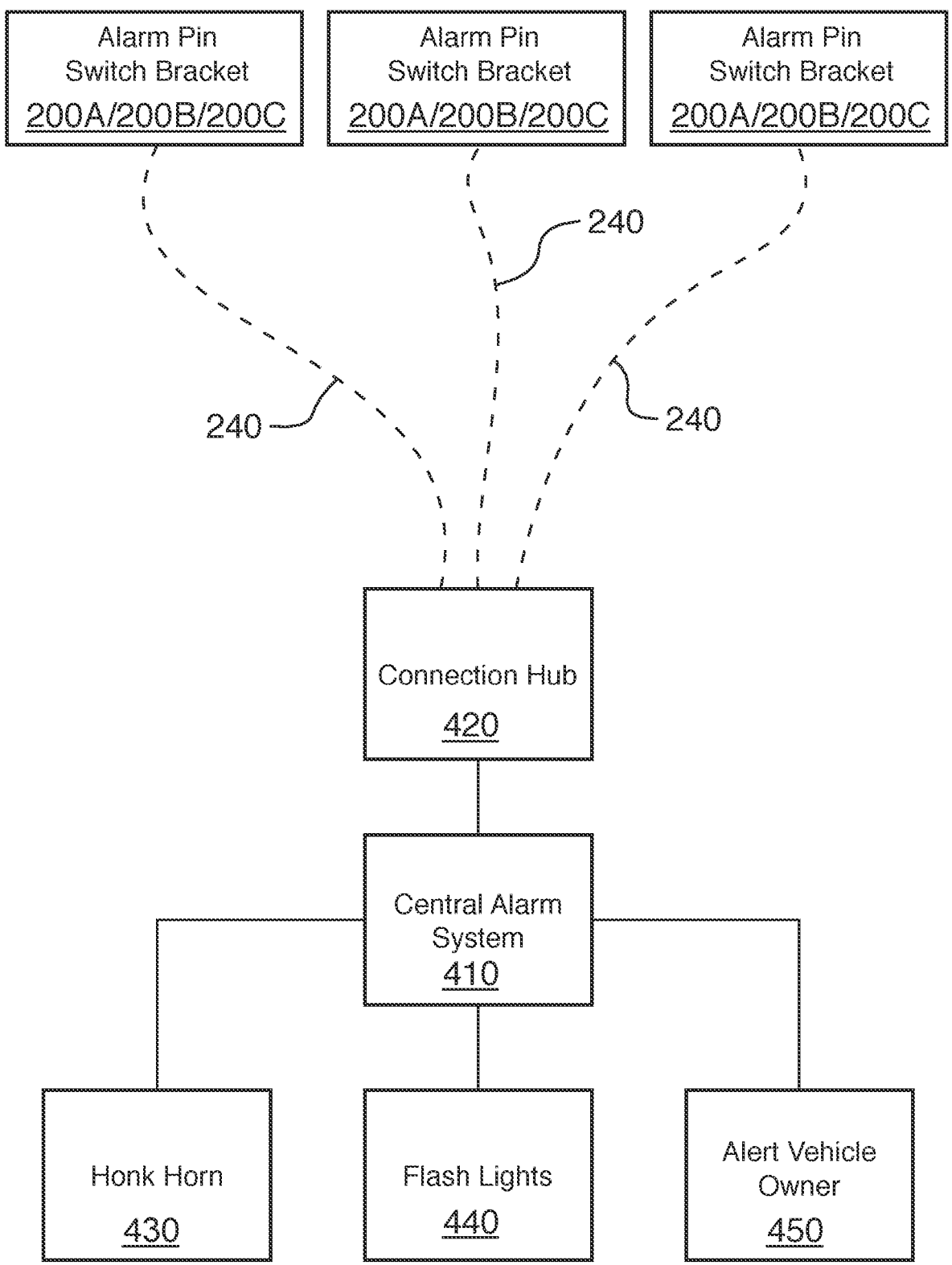
FIG. 4 shows a schematic block diagram of a service vehicle storage compartment door alarm system in accordance with an embodiment.

Now referring to FIG. 4, shown is a schematic block diagram of the vehicle storage compartment door alarm system 400 in accordance with an embodiment. The alarm pin switch bracket 200 can be either the alarm pin switch brackets 200A or 200B described above, or another type of bracket such as bracket 200C described further below. It will be appreciated that these are illustrative examples, and that other types of brackets incorporating an alarm pin switch are also envisioned.

As explained above, a plurality of alarm switch brackets 200A/200B/200C installed on a plurality of vehicle storage compartment handles may each be connected via a signal wire 240 to lead to a central alarm system 410. To facilitate connection of a plurality of alarm switch brackets 200A/200B/200C, a connection hub 420 may be used to connect all the signal wires 240 together. This allows a single connection to a signal wire connection point provided on the central alarm system 410.

Still referring to FIG. 4, the central alarm system 410 in turn is adapted to activate an alarm which may include one or more of honking the vehicle horn 430, flashing the vehicle lights 440, and/or alerting the vehicle owner 450 via a wireless connection, such as a wireless cellular network.

Figure 5:
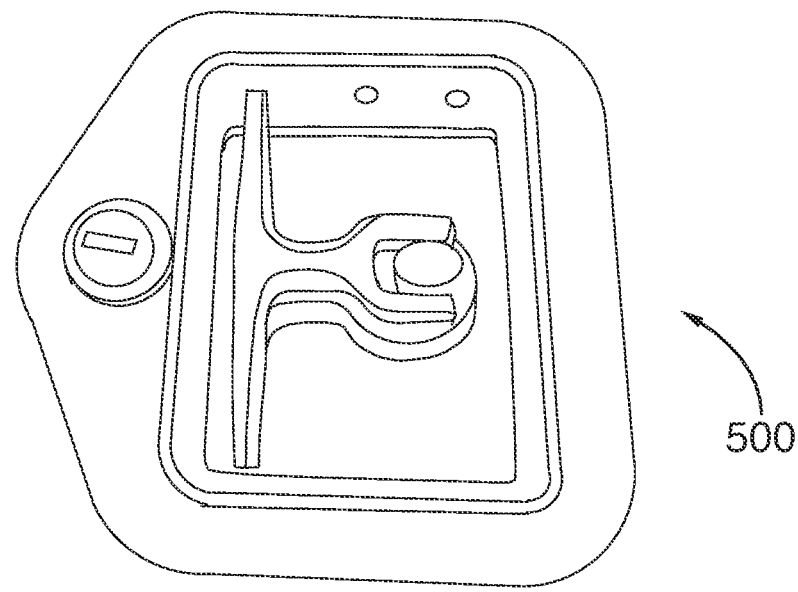
FIG. 5 shows an illustrative example of a T-handle that is also often used as a truck storage compartment handle.

Now referring to FIG. 5, shown is an illustrative example of a two-point T-handle door lock 500 that is also often used as a service truck storage compartment latch.

Figure 6:
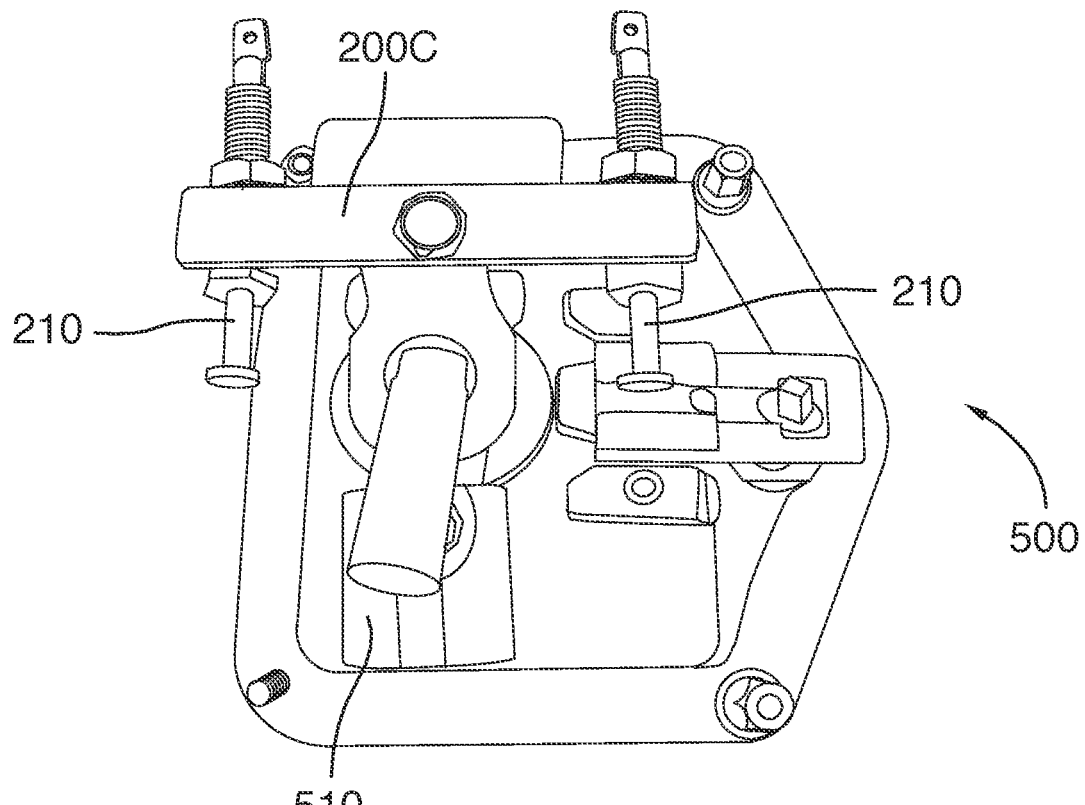
FIG. 6 shows a rear perspective view of the T-handle of FIG. 5 having an alarm pin switch bracket and a striker plate mounted thereon.

FIG. 6 shows a rear perspective view of the T-handle of FIG. 5. In this illustrative example; alarm pin switch bracket 200C, analogous to alarm pin switch bracket 200A and 200B, can be installed as an aftermarket part to position an alarm pin switch 210. In this illustrative example, two alarm pin switches 210 are installed by way of example to show two possible locations for installation depending on whether the T-handle is installed with a left orientation or with a right orientation for opening the latch. Only one alarm pin switch 210 would be required for installation once the installed orientation of the two-point T-handle door lock 500 is known.

Figure 7:
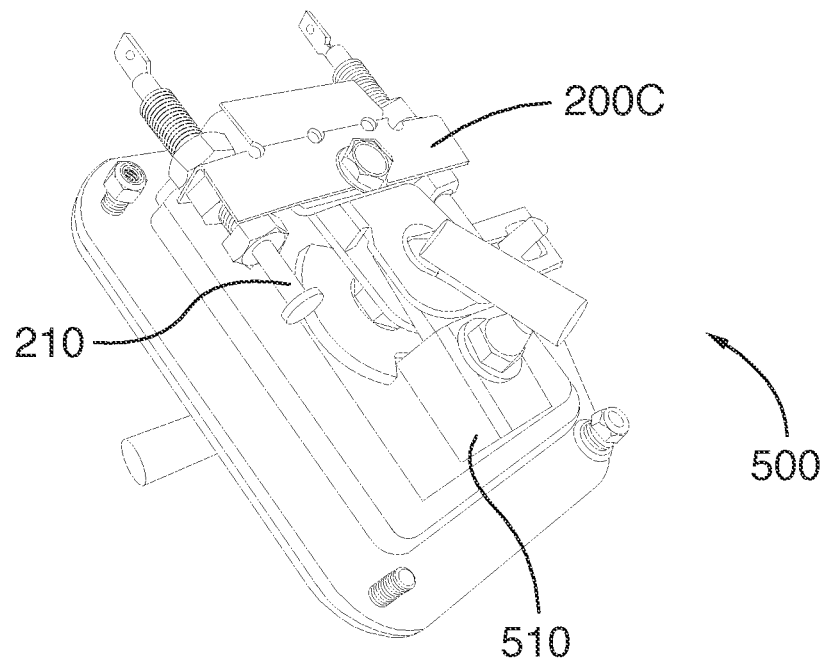
FIGS. 7-10 show various alternative perspective views of the T-handle of FIG. 5 and the alarm pin switch bracket and striker plate mounted thereon.
Figure 8:
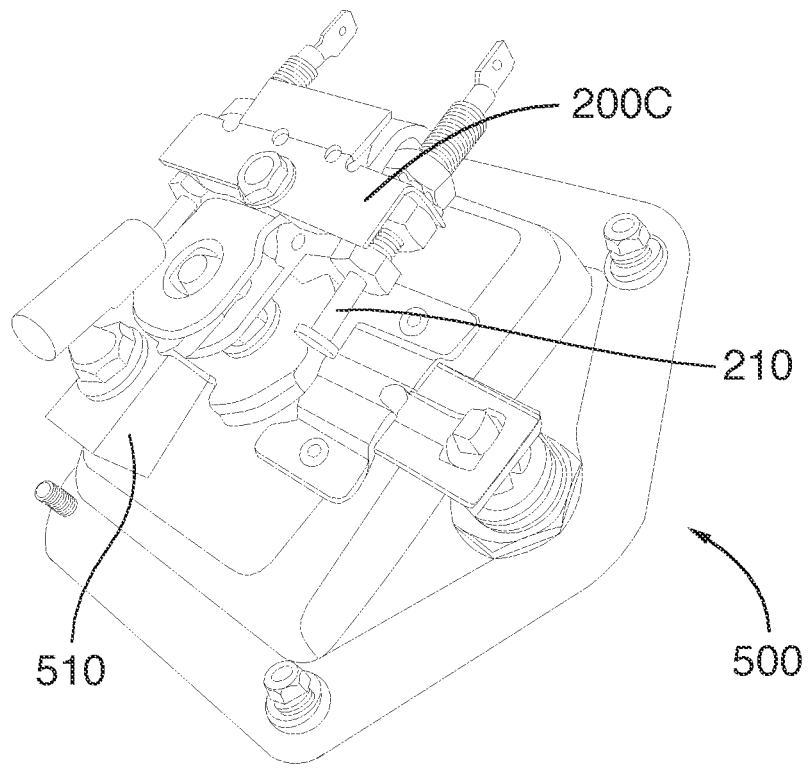

Also shown in the foreground is a striker plate 510 which is adapted to strike either one of the alarm pin switches 210, depending on the direction of rotation of the T-handle door lock 500. Left and right views of the striker plate 510 are better shown in FIG. 7 and FIG. 8, respectively. Both the alarm pin switch bracket 200C and the striker plate 510 may be installed as after-market parts using bolt and nut assemblies on the rotating and non-rotating portion of the latch system.

Figure 9:
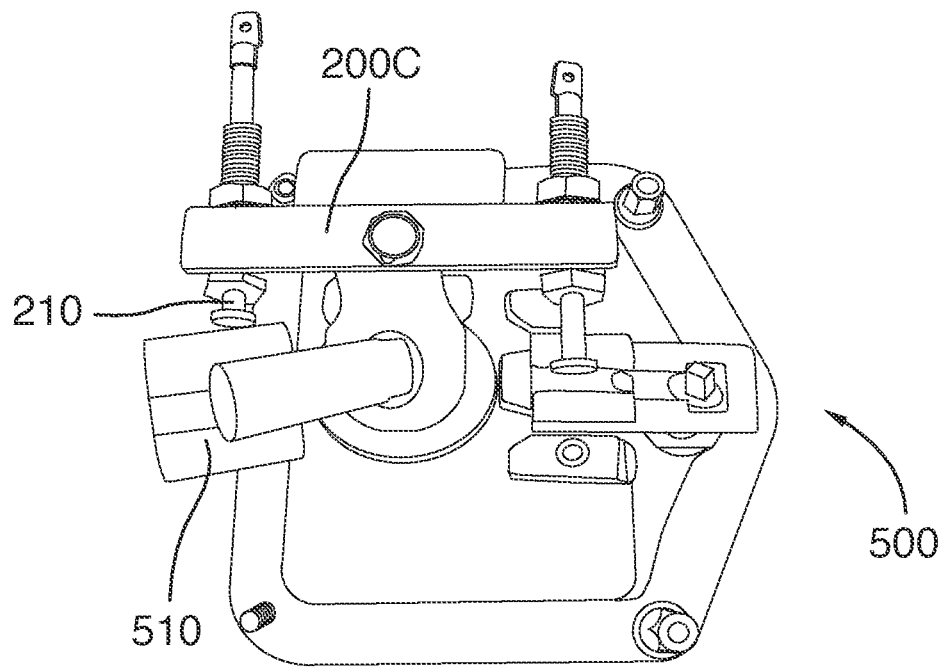

Now referring to FIG. 9, shown is another rear perspective view of the T-handle of FIG. 5 in which the T-handle is closed, and a left alarm pin switch 210 is engaged by the striker plate 510.

Figure 10:
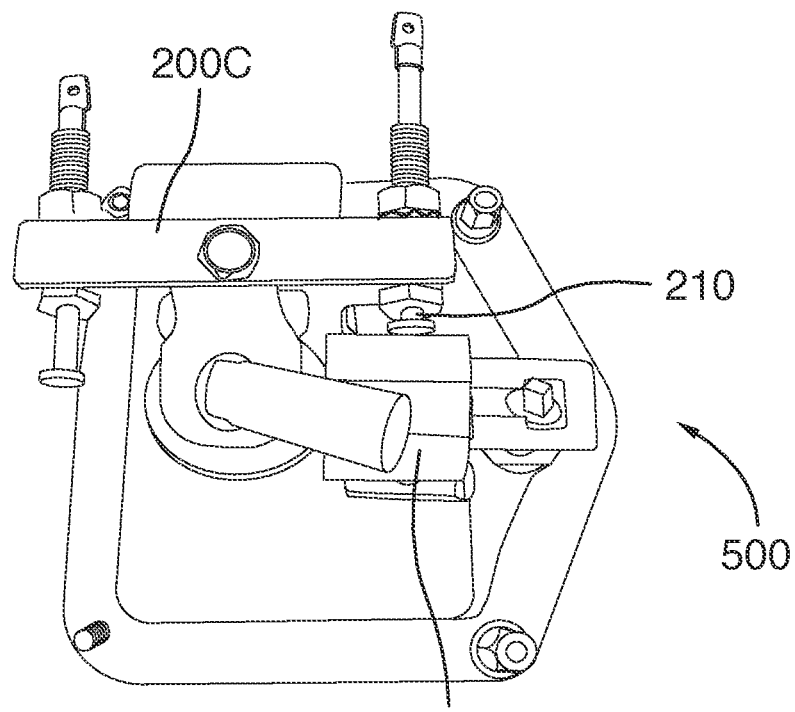
Figure 11:
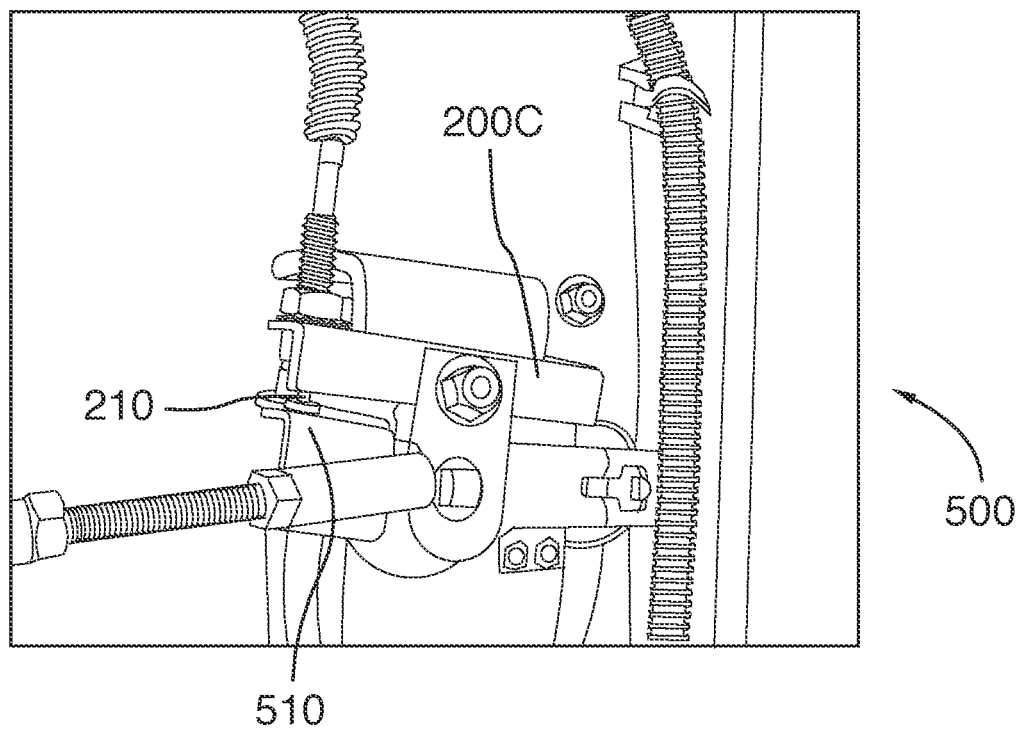
FIGS. 11 and 12 show views of a T-Handle latch with a left closure mounting, having an alarm pin switch bracket and striker plate mounted thereon.
Figure 12:
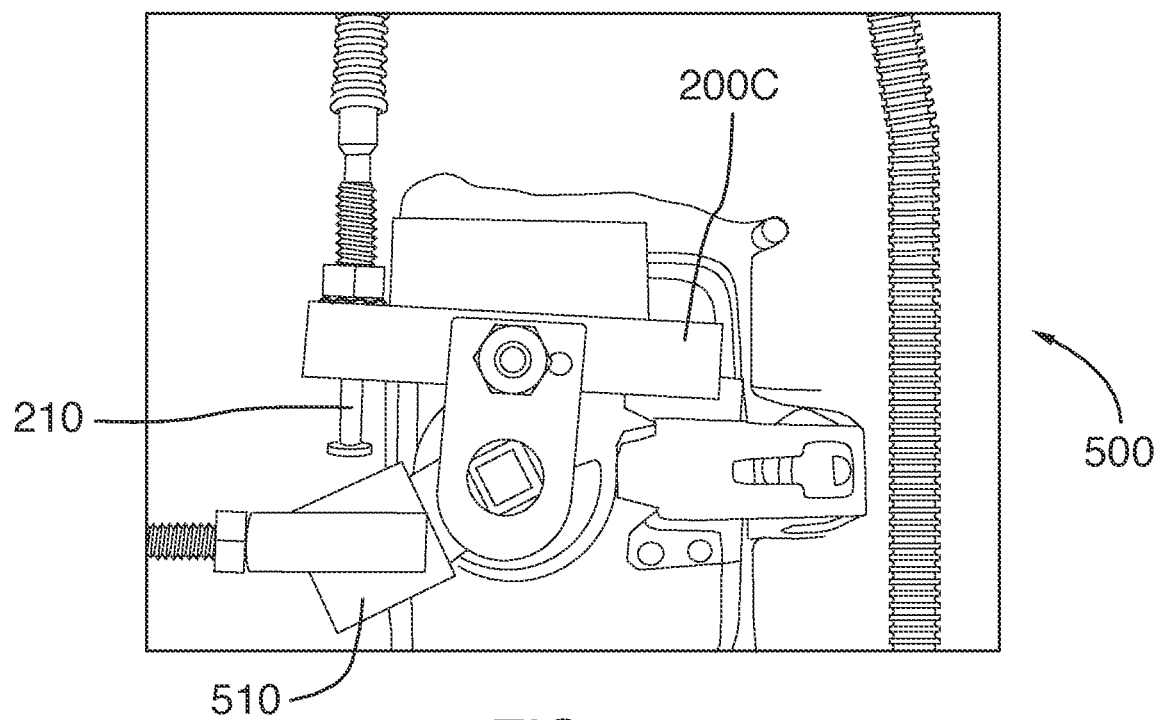
Figure 13A:
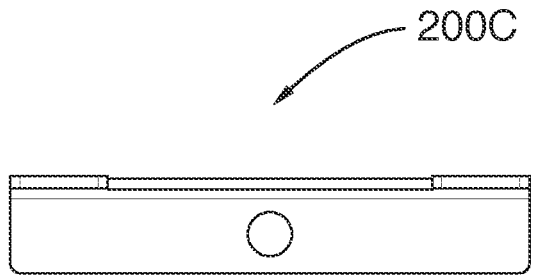
FIGS. 13A-13E show illustrative views of an alarm pin switch bracket in accordance with another embodiment.
Figure 13B:
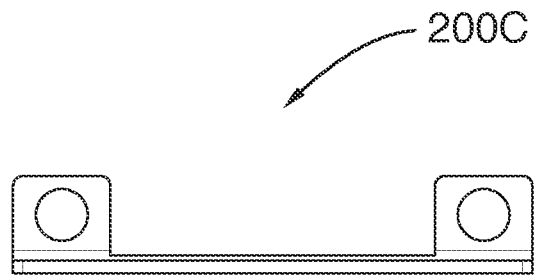
Figure 13C:
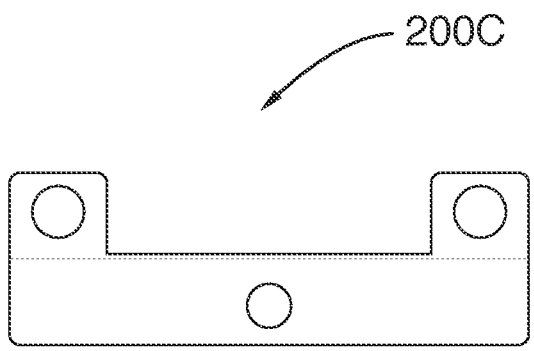
Figure 13D:
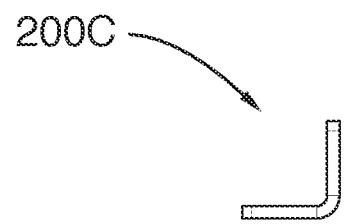
Figure 13E:
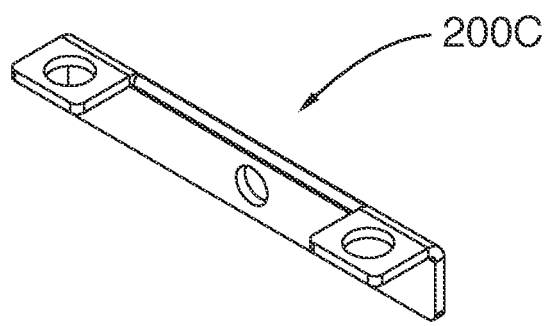
Figure 14A:
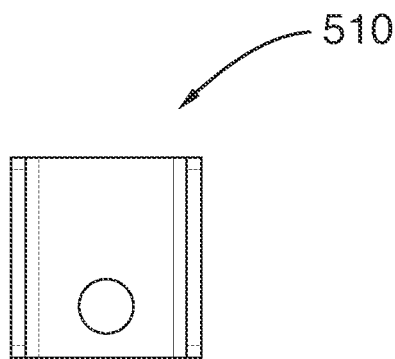
FIGS. 14A-14E show illustrative views of a corresponding striker plate in accordance with an embodiment.
Figure 14B:
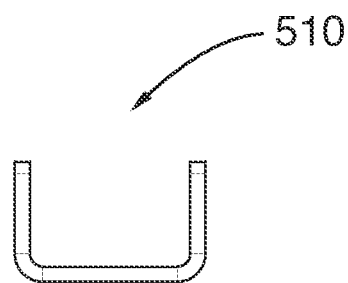
Figure 14C:
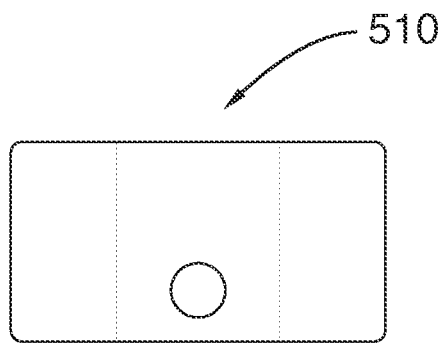
Figure 14D:
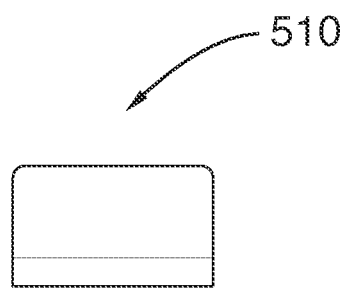
Figure 14E:
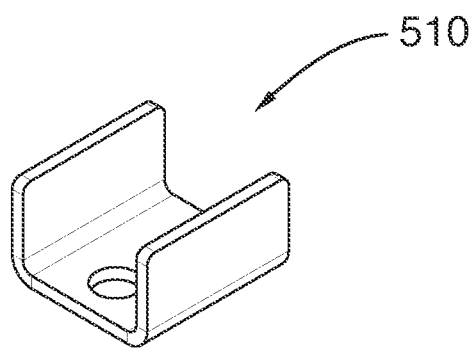

Alternatively, FIG. 10 shows another rear perspective view of the T-handle of FIG. 5 in which the T-handle is closed, and a right alarm pin switch 210 is engaged by the striker plate 510. FIGS. 11 and 12 show a rear view of a mounted T-Handle with a LEFT Closure orientation.

FIGS. 13A-13E show various views of alarm pin switch bracket 200C in accordance with an embodiment.

FIGS. 14A-14E show various views of a corresponding striker plate 510 in accordance with an embodiment.

In another aspect, the present compartment door alarm system may incorporate an alarm pin switch bracket for a master lock security system that may also be incorporated into some service trucks.

Figure 15:
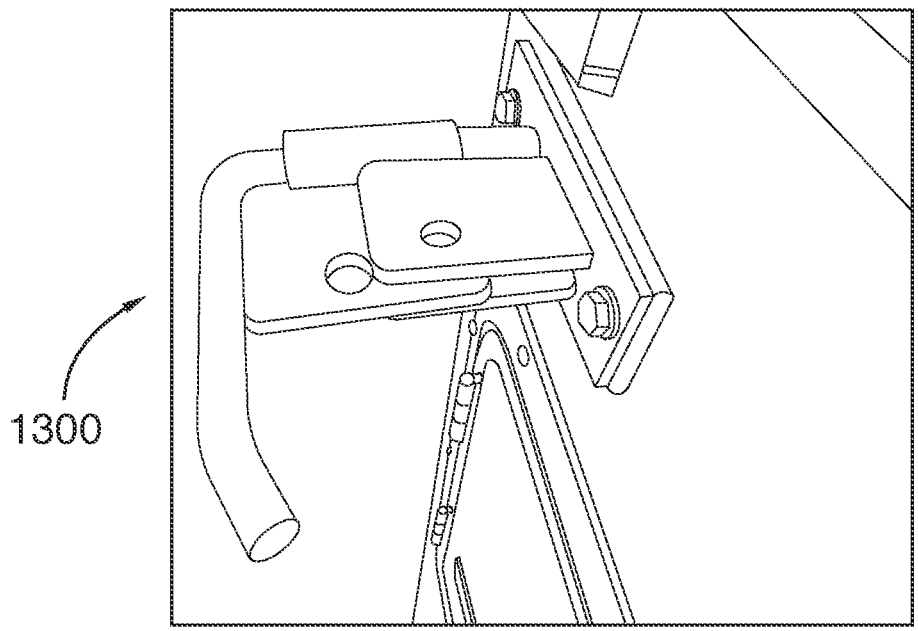
FIG. 15 shows an illustrative example of a master lock mechanism in a disengaged position.
Figure 16:
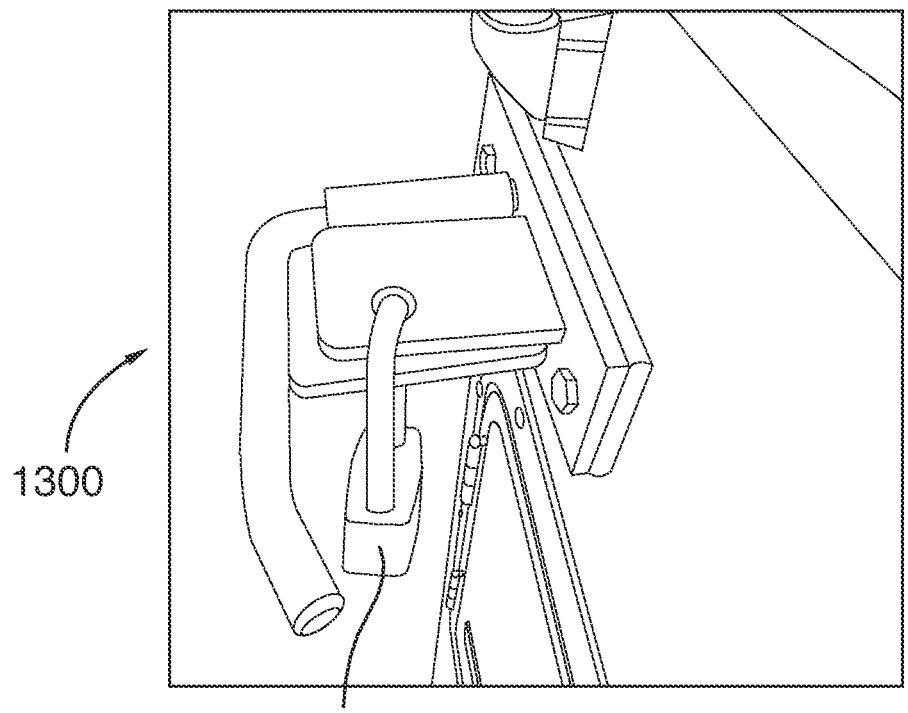
FIG. 16 shows an illustrative example of the master lock mechanism of FIG. 15 in an engaged and padlocked position.

While the master lock systems may vary with different manufacturers, the mechanics of a master lock system is generally consistent. FIG. 15 shows an illustrative example of one such master lock mechanism 1300 in a disengaged position. FIG. 16 shows the master lock mechanism of FIG. 15 in an engaged and locked in position with a padlock 1310.

Figure 17:
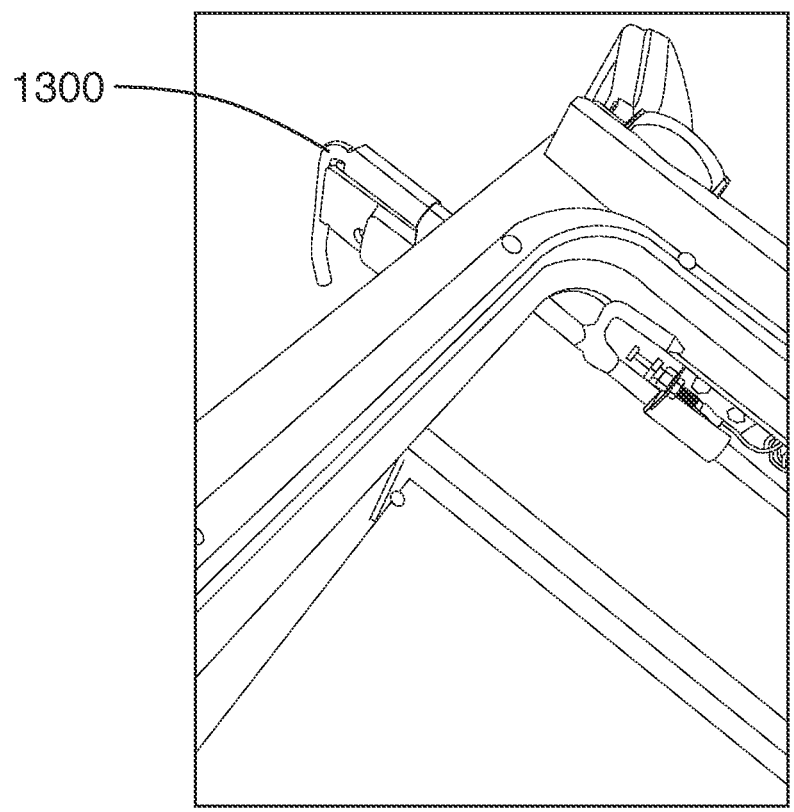
FIG. 17 shows an illustrative internal view of the master lock mechanism of FIG. 15 in a disengaged position.
Figure 18:
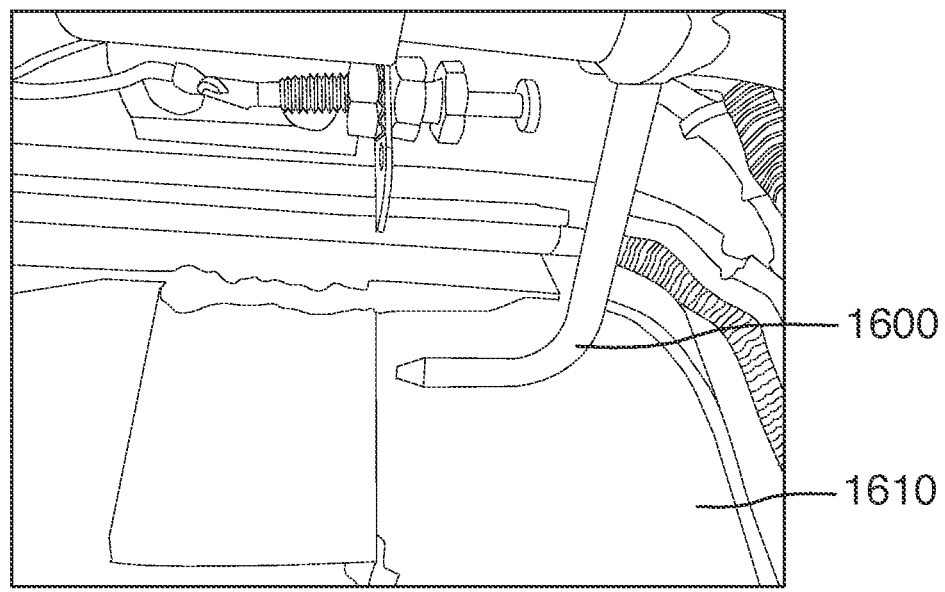
FIG. 18 shows another illustrative internal view of the master lock mechanism of FIG. 15 in a disengaged position, and with the compartment door closed.
Figure 19:
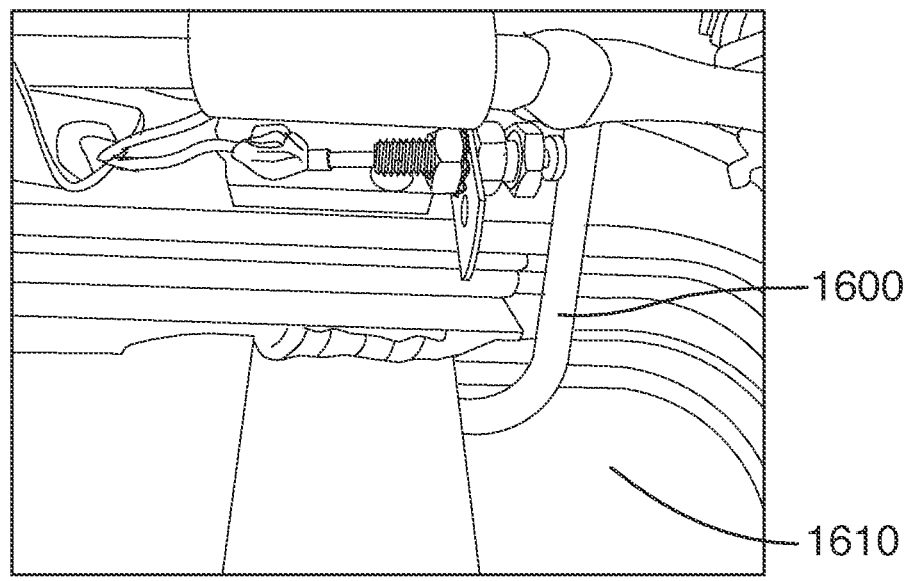
FIG. 19 shows another illustrative internal view of the master lock mechanism of FIG. 15 in an engaged position, and with the compartment door closed.

In this illustrative example, the master lock mechanism incorporates a push-pull type handle that, when engaged, puts a metal rod into a receiver in each service truck compartment door simultaneously. By way of example, FIG. 17 shows an illustrative internal view of the master lock mechanism of FIG. 15 in a disengaged position. FIG. 18 shows another illustrative internal view of the master lock mechanism of FIG. 15 in a disengaged position, with a hook 1600 disengaged, and with the compartment door closed. FIG. 19 shows another illustrative internal view of the master lock mechanism of FIG. 16 in an engaged position with hook 1600 engaged with a portion of a frame of the compartment door 1610.

Once engaged, the master lock mechanism will then be locked, e.g. with a pad lock 1310 as shown in FIG. 16. The master lock mechanism inhibits a compartment a door from being opened if an individual door handle is defeated. However, a compartment door can usually still be opened a small amount, thereby allowing a thief the opportunity to pry open the door—destroying the whole door and gaining access to the compartment. By placing an alarm pin switch on the master lock mechanism as well, a thief can be thwarted from staying around long enough to force open a door, as the alarm would be triggered as soon as the master door lock mechanism is moved.

Figure 20:
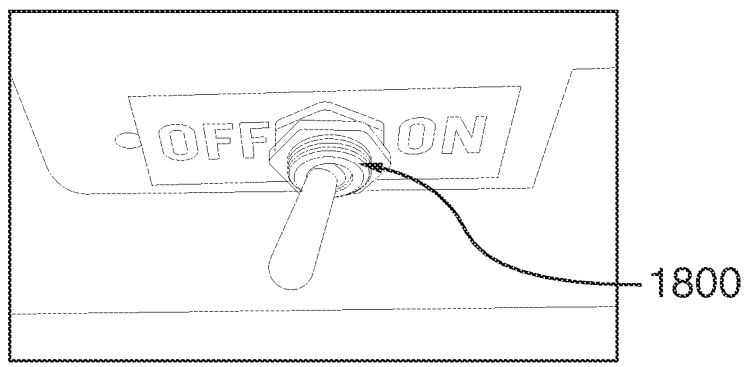
FIG. 20 shows an illustrative view of the master lock security system switch in an off position.

Using the master lock mechanism to facilitate arming the system is not practical for personnel using the storage compartments during the work day. To accommodate this, an ON/OFF switch is incorporated and when the ON/OFF switch is OFF the master lock mechanism does NOT need to be engaged to arm the alarm system, however, each compartment door latch will still be armed when the system is armed. FIG. 20 shows an illustrative view of an ON/OFF switch 1800 for the master lock security system in an OFF position.

Figure 21:
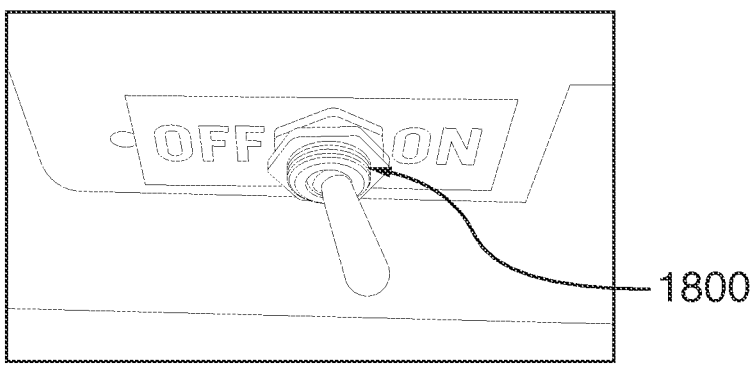
FIG. 21 shows an illustrative view of the master lock security system switch in an on position.

For an extra layer of security at night or when the Service Truck will be unattended for an extended period; the ON/OFF switch will be turned ON and the master lock mechanism will be engaged, thereby pushing in the plunger of the alarm pin switch facilitating arming the system, and the master lock mechanism will be locked with a padlock. FIG. 21 shows an illustrative view of an ON/OFF switch 1800 for the master lock security system in an ON position.

Figure 22:
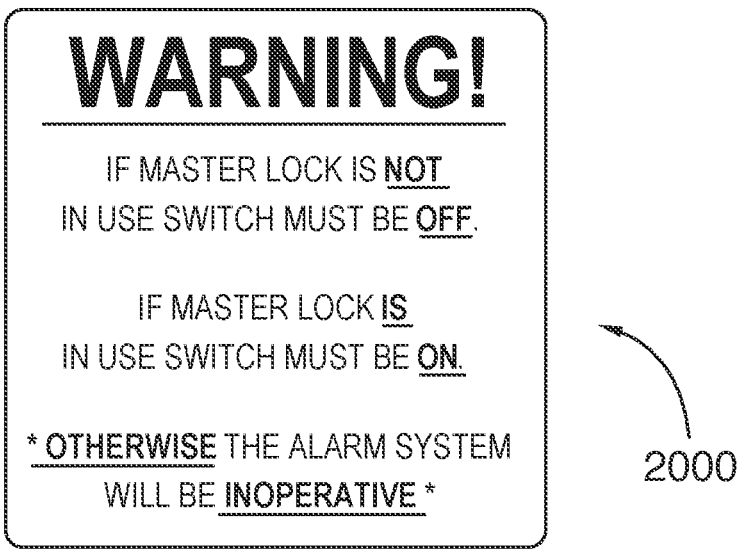
FIG. 22 shows an illustrative example of a master lock security system warning label for operators, located inside each compartment door that houses the on off switch of FIGS. 20 and 21.

FIG. 22 shows an illustrative example of a master lock security system warning label 2000 for operators, located inside each compartment door that houses the ON/OFF switch 1800 of FIGS. 20 and 21. This warning label 2000 will ensure that the operators have the ON/OFF switch 1800 in the correct position in correlation to the position of the master lock mechanism. If the ON/OFF switch 1800 is ON and the master lock mechanism is NOT engaged, the alarm pin switch will be grounded and none of the compartments will be armed.

When used in conjunction with the door alarm system on each compartment door latch, the master lock mechanism alarm system provides a second layer of security. That is, if a thief forcibly removed the pad lock and disengaged the master lock mechanism, this will trigger an alarm via the installed alarm pin switch. Alternatively, if a thief tries to break open a compartment door latch individually, the alarm pin switch on each door handle would be triggered.

Figure 23:
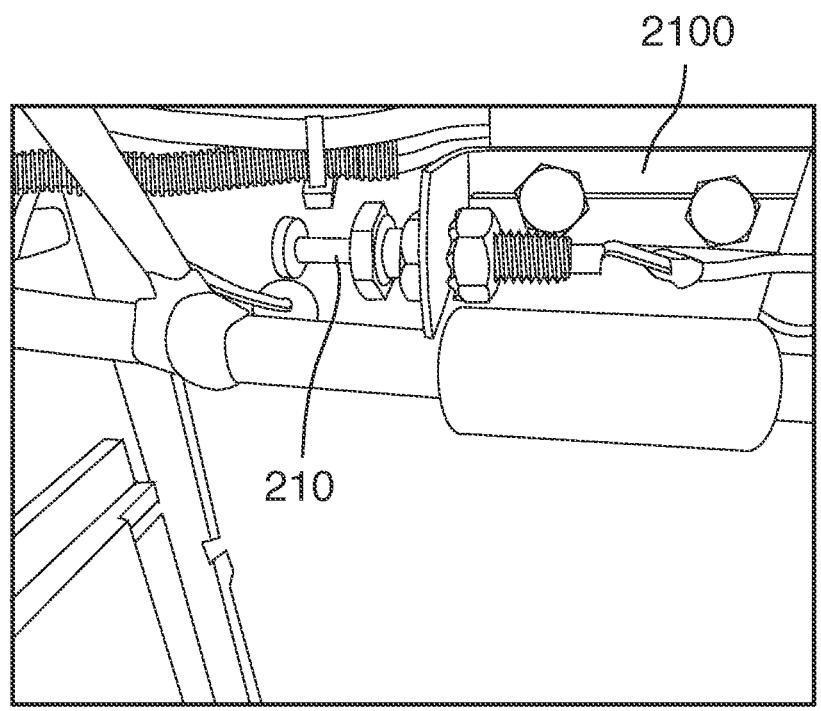
FIG. 23 and FIG. 24A-FIG. 24E show an illustrative example of an alarm pin switch bracket adapted for the master lock security system of FIGS. 15-21.
Figure 24A:
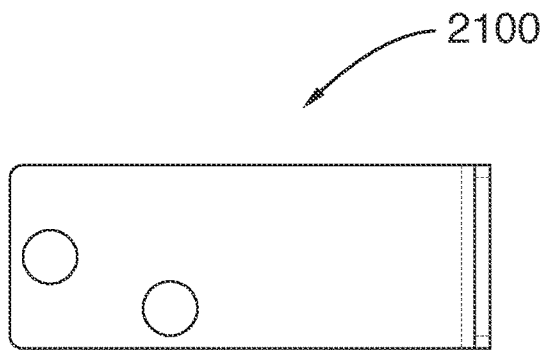
Figure 24B:
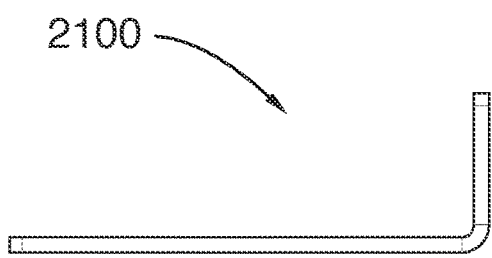
Figure 24C:
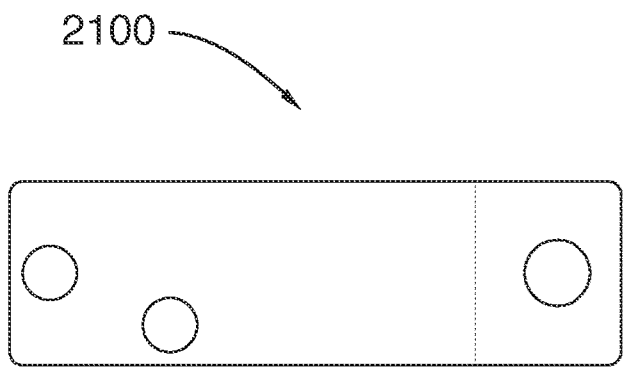
Figure 24D:
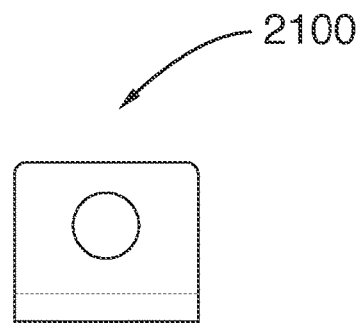
Figure 24E:
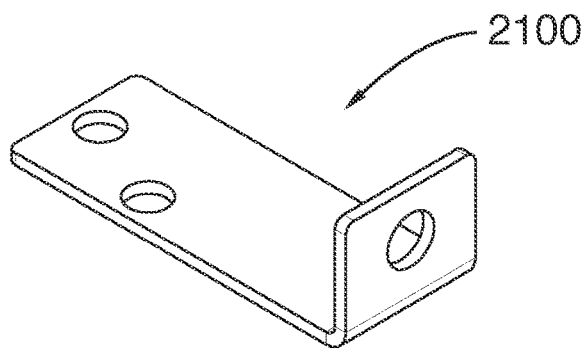

FIG. 23 shows an illustrative example of an alarm pin switch bracket, here comprising a simple L-bracket 2100, configured to position an alarm pin switch 2120 to trigger an alarm for the master lock security system of FIGS. 15-21 when the ON/OFF switch 1800 is in the ON position. FIG. 24 Engineered Drawing of the Master Lock 'L' Shape Alarm Pin Switch Bracket.

While various illustrative embodiments have been described, it will be appreciated that an alarm pin switch bracket in accordance with the present invention may be installed as an aftermarket upgrade of a vehicle storage compartment door having this type of a WHALE TAIL™ regular or roller type latch, or a T-handle. It will be appreciated that the alarm pin switch bracket may also be adapted to other types of vehicle storage compartment door handles requiring rotation or lifting to operate the compartment door latch.

Advantageously, by triggering an alarm as soon as an attempt is made to force open a service vehicle storage compartment door, a potential thief is not given an opportunity to successfully force open the compartment door without lingering and increasing their chances of getting caught.

Thus, in an aspect, there is provided a service vehicle storage compartment door alarm system, comprising: an alarm pin switch bracket having one or more apertures for mounting the alarm pin switch bracket to a vehicle storage compartment door latch using existing mounting fasteners; and an alarm pin switch mounted to the alarm pin switch bracket, the alarm pin switch adapted to detect movement of the vehicle storage compartment door handle to trigger an alarm signal, the alarm pin switch including a connection point for connecting a signal wire.

In an embodiment, the vehicle storage compartment door latch comprises a handle requiring rotation to operate the compartment door latch, and the alarm pin switch mounted to the alarm pin switch bracket is triggered by rotation of the handle.

In another embodiment, the vehicle storage compartment door latch comprises a handle requiring rotation in one of a first direction or a second direction, and the alarm pin switch mounted to the alarm pin switch bracket is configured to be triggered by rotation of the handle in one of the first direction or the second direction.

In another embodiment, the vehicle storage compartment door latch comprises a handle requiring rotation in either one of a first direction or a second direction, and the alarm pin switch mounted to the alarm pin switch bracket is configured to be triggered by rotation of the handle in either one of the first direction or the second direction.

In another embodiment, the vehicle storage compartment door latch comprises a handle requiring lifting to operate the compartment door latch, and the alarm pin switch mounted to the alarm pin switch bracket is triggered by lifting of the handle.

In another embodiment, the vehicle storage compartment door latch comprises a handle requiring pulling to operate the compartment door latch, and the alarm pin switch mounted to the alarm pin switch bracket is triggered by pulling of the handle.

In another embodiment, a plurality of alarm pin switches are connected via signal wires to a central alarm system for activating an alarm upon detection of movement of any one of the vehicle storage compartment door handles.

In another embodiment, the plurality of alarm pin switches are connected via wires to a connection hub prior to attaching to the alarm system.

In another embodiment, the plurality of alarm pin switches are configured to activate the alarm upon detection of movement of any of the service vehicle compartment door handles.

In another embodiment, the vehicle storage compartment door latch comprises a roller-type latch, and the alarm pin switch is configured to be activated by the roller.

In another embodiment, the vehicle storage compartment door latch comprises a T-handle type latch, and the alarm pin switch is configured to be activated by operation of the T-handle.

In another embodiment, the alarm pin switch is activated when one or more alarm pin switch metal tabs contact the pin switch body, thereby creating a ground fault.

In another aspect, there is provided a service vehicle storage compartment door alarm system, comprising: an alarm pin switch bracket for positioning an alarm pin switch for one or more of compartment door latches, and a master door locking mechanism for locking a plurality of compartment doors; whereby, in use, an alarm is triggered by operating a door handle or by attempting to defeat the master door lock mechanism.

In an embodiment, the master door locking mechanism locks the plurality of compartment doors independently of the individual vehicle storage compartment door latches.

Various changes and modifications may be made without departing from the scope of the invention, which is defined by the following claims.

The invention claimed is:

1. A service vehicle storage compartment door alarm system, comprising:
    an alarm pin switch bracket having one or more apertures for mounting the alarm pin switch bracket to a vehicle storage compartment door latch using existing mounting fasteners; and
    an alarm pin switch mounted to the alarm pin switch bracket, the alarm pin switch adapted to detect movement of the vehicle storage compartment door handle to trigger an alarm signal, the alarm pin switch including a connection point for connecting a signal wire;
    wherein the vehicle storage compartment door latch comprises a handle requiring rotation to operate the compartment door latch, and the alarm pin switch mounted to the alarm pin switch bracket is triggered by rotation of the handle.

2. The service vehicle storage compartment door alarm system of claim 1, wherein the vehicle storage compartment door latch comprises a handle requiring rotation in one of a first direction or a second direction, and the alarm pin switch mounted to the alarm pin switch bracket is configured to be triggered by rotation of the handle in one of the first direction or the second direction.

3. The service vehicle storage compartment door alarm system of claim 1, wherein the vehicle storage compartment door latch comprises a handle requiring rotation in either one of a first direction or a second direction, and the alarm pin switch mounted to the alarm pin switch bracket is configured to be triggered by rotation of the handle in either one of the first direction or the second direction.

4. The service vehicle storage compartment door alarm system of claim 1, wherein a plurality of alarm pin switches are connected via signal wires to a central alarm system for activating an alarm upon detection of movement of any one of the vehicle storage compartment door handles.

5. The service vehicle storage compartment door alarm system of claim 4, wherein the plurality of alarm pin switches are connected via wires to a connection hub prior to attaching to the alarm system.

6. The service vehicle storage compartment door alarm system of claim 5, wherein the plurality of alarm pin switches are configured to activate the alarm upon detection of movement of any of the service vehicle compartment door handles.

7. The service vehicle storage compartment door alarm system of claim 1, wherein the alarm pin switch is activated when one or more alarm pin switch metal tabs contact the alarm pin switch, thereby creating a ground fault.

8. A service vehicle storage compartment door alarm system, comprising:
- an alarm pin switch bracket for positioning an alarm pin switch for one or more of compartment door latches, and
- a master door locking mechanism for locking a plurality of compartment doors;
- whereby, in use, an alarm is triggered by operating a door handle or by attempting to defeat the master door lock mechanism.

9. The service vehicle storage compartment door alarm system of claim 8, wherein the master door locking mechanism locks the plurality of compartment doors independently of the individual vehicle storage compartment door latches.

* * * * *